United States Patent
Lee

(10) Patent No.: US 9,389,148 B2
(45) Date of Patent: *Jul. 12, 2016

(54) STEERING SENSOR ASSEMBLY

(71) Applicant: LG INNOTEK CO., LTD., Seoul (KR)

(72) Inventor: Chang Hwan Lee, Gyeongsan-si (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/063,157

(22) Filed: Oct. 25, 2013

(65) Prior Publication Data

US 2014/0047914 A1 Feb. 20, 2014

Related U.S. Application Data

(63) Continuation of application No. 13/139,657, filed as application No. PCT/KR2009/003580 on Jul. 1, 2009, now Pat. No. 8,590,370.

(30) Foreign Application Priority Data

Dec. 16, 2008 (KR) .................. 20-2008-0016691 U

(51) Int. Cl.
*G01M 17/007* (2006.01)
*B62D 6/10* (2006.01)
(Continued)

(52) U.S. Cl.
CPC ............. *G01M 17/007* (2013.01); *B62D 6/10* (2013.01); *B62D 15/0215* (2013.01); *G01D 11/245* (2013.01); *G01L 5/221* (2013.01)

(58) Field of Classification Search
CPC ...... B62D 6/10; B62D 15/0215; B62D 15/02; G01L 3/104; G01L 3/10; G01L 5/221; G01L 3/101
USPC ......................................... 73/117.02, 862.321
See application file for complete search history.

(56) References Cited

U.S. PATENT DOCUMENTS 6,190,264 B1 * 2/2001 Al-Rawi ................ G01L 3/107 464/185
6,510,750 B2    1/2003 Schlabach et al.
(Continued)

FOREIGN PATENT DOCUMENTS

CN    101243309 A    8/2008
EP    1477390 A2    11/2004
(Continued)

OTHER PUBLICATIONS

Office Action dated Jan. 22, 2013 in Chinese Application No. 200980150627.2, filed Jul. 1, 2009.
(Continued)

*Primary Examiner* — Freddie Kirkland, III
(74) *Attorney, Agent, or Firm* — Saliwanchik, Lloyd & Eisenschenk

(57) ABSTRACT

Provided is a power steering sensor assembly which is capable of maintaining a stable coupling between a sensing device and a housing without using a separate auxiliary member, and is mounted in an electric power steering system. The power steering sensor assembly includes a sensing device including a plurality of coupling projections formed on an outer circumferential surface thereof; and a first housing having the sensing device housed therein and including a plurality of coupling grooves formed on an inner circumferential surface thereof, the coupling grooves each having an upper end which is opened. When the sensing device is housed in the first housing, the coupling projections of the sensing device are inserted into the coupling grooves of the first housing, respectively, such that the sensing device is coupled to the first housing without being moved in a radial direction and an axial direction.

20 Claims, 5 Drawing Sheets

(51) Int. Cl.
    *B62D 15/02*      (2006.01)
    *G01D 11/24*      (2006.01)
    *G01L 5/22*      (2006.01)

(56) References Cited

U.S. PATENT DOCUMENTS

| | | | | |
|---|---|---|---|---|
| 6,546,816 | B2* | 4/2003 | Schlabach | F16D 3/04 464/137 |
| 7,095,198 | B1 | 8/2006 | O'Brien | |
| 7,174,794 | B2* | 2/2007 | Sugiyama | B62D 6/10 73/856 |
| 7,174,795 | B2* | 2/2007 | Feng | G01D 5/145 73/862.331 |
| 7,293,476 | B2* | 11/2007 | Gierut | G01L 3/242 73/862.335 |
| 7,363,825 | B2* | 4/2008 | Feng | G01L 2/104 73/862.325 |
| 7,468,603 | B2* | 12/2008 | Kang | G06F 3/0362 324/207.2 |
| 7,789,191 | B2* | 9/2010 | Deshmukh | B62D 5/0406 180/444 |
| 8,066,092 | B2* | 11/2011 | Shimizu | B62D 1/16 180/443 |
| 8,499,650 | B2* | 8/2013 | Kuroki | G01L 3/10 73/862.08 |
| 8,590,370 | B2* | 11/2013 | Lee | B62D 6/10 73/117.02 |
| 2003/0041677 | A1* | 3/2003 | Schlabach | F16D 3/04 73/862.326 |
| 2005/0211001 | A1* | 9/2005 | Sugiyama | B62D 6/10 73/862.08 |
| 2006/0236784 | A1* | 10/2006 | Feng | G01L 3/104 73/862.332 |
| 2008/0164088 | A1* | 7/2008 | Shimizu | B62D 5/0469 180/446 |
| 2008/0264713 | A1* | 10/2008 | Deshmukh | B62D 5/0406 180/446 |
| 2011/0240400 | A1* | 10/2011 | Shimizu | B62D 5/0469 180/446 |
| 2011/0247408 | A1* | 10/2011 | Lee | B62D 6/10 73/117.02 |

FOREIGN PATENT DOCUMENTS

| | | |
|---|---|---|
| JP | 10-078358 A | 3/1998 |
| JP | 11-183279 A | 7/1999 |
| JP | 2005-017187 A | 1/2005 |
| JP | 2005-156485 A | 6/2005 |
| KR | 10-2004-0054889 A | 6/2004 |
| KR | 10-2005-0019146 A | 3/2005 |
| KR | 10-2006-0118696 A | 11/2006 |

OTHER PUBLICATIONS

Office Action dated Apr. 2, 2013 in Japanese Application No. 2011-540590, filed Jul. 1, 2009.

* cited by examiner

STEERING SENSOR ASSEMBLY

CROSS-REFERENCE TO RELATED APPLICATIONS

This application is a continuation of U.S. application Ser. No. 13/139,657, filed Jun. 14, 2011, which is the U.S. national stage application of international Patent Application No. PCT/KR2009/003580, filed Jul. 1, 2009, which claims priority to Korean Application No. 20-2008-0016691, filed Dec. 16, 2008, the disclosures of each of which are incorporated herein by reference in their entirety.

TECHNICAL FIELD

The present invention relates to a power steering sensor assembly, and more particularly, to a power steering sensor assembly capable of realizing a secure coupling between a sensing device and a housing.

BACKGROUND ART

An electric power steering system refers to a device for changing the direction of wheels through a steering wheel, in order to change the direction of a moving car. A recent electric power steering system includes a steering angle sensing device and a torque sensing device to provide driving stability and users' convenience.

The steering angle sensing device refers to a device for sensing a steering degree to control a moving car, and the torque sensing device refers to a device for sensing torque applied to a torsion bar to provide an auxiliary control power such that a steering wheel may be smoothly controlled.

The steering angle sensing device and the torque sensing device may be separately provided and mounted in the electric power steering system. Alternatively, the steering angle sensing device and the torque sensing device may be provided as a single device and mounted in the electric power steering system.

The steering angle sensing device and the torque sensing device are assembled together with other components such as a housing and then mounted in the electric power steering system. Hereinafter, the steering angle sensing device and the torque sensing device are referred to as a sensing device, and the steering angle sensing device and an assembly of other components, the torque sensing device and an assembly of other components, and the steering angle sensing device, the torque sensing device, and an assembly of other components, respectively, are referred to as "power steering sensor assembly", for convenience of description.

Since the sensing device is sensitive to the external environment, the sensing device is mounted in a sealed housing. That is, the power steering sensor assembly includes the above-described sensing device and fast and second housings for housing the sensing device.

The sensing device positioned in the housing should be fixed inside the housing. For this structure, an auxiliary member such as an O-ring is mounted on the outer circumferential surface of the sensing device, and the sensing device is then positioned in the housing.

In such a state, the outer circumferential surface of the O-ring is closely attached to the inner circumferential surface of the housing. Accordingly, the sensing device is fixed and mounted in the housing.

However, the above-described structure including the sensing device mounted in the housing has a problem in that an additional member such as the O-ring should be prepared and coupled to the sensing device.

Furthermore, in an electric power steering system mounted in a vehicle to which an outer force (impact) is repetitively applied, an O-ring may be distorted from the original position or may come off from the sensing device.

DISCLOSURE

Technical Problem

Accordingly, the present invention has been made in an effort to solve the problems occurring in the related art, and an object of the present invention is to provide a power steering sensor assembly which is capable of maintaining a stable coupling between a sensing device and a housing without using a separate auxiliary member.

Technical Solution

According to one aspect of the present invention, there is provided a power steering sensor assembly mounted in an electric power steering system, including: a sensing device including input and output shafts connected to each other and a plurality of coupling projections formed on an outer circumferential surface thereof; and a first housing having the sensing device housed therein and including a plurality of coupling grooves formed on an inner circumferential surface thereof, the coupling grooves each having an upper end which is opened. When the sensing device is housed in the first housing, the coupling projections of the sensing device are inserted into the coupling grooves of the first housing, respectively, such that the sensing device is coupled to the first housing without being moved in a radial direction and an axial direction.

The power steering sensor assembly may further include a second housing coupled to the first housing to separate the sensing device from outside.

Each of the coupling projections of the sensing device may include two bar-shaped members separated from each other in a radial direction in a state in which the coupling projections are fixed to the outer circumferential surface of the sensing device, and each of the bar-shaped members may be formed of an elastic material.

The sensing device may include a plurality of contact projections formed on the outer circumferential surface thereof, extended in the radius direction, and contacted with an inner circumferential surface of the first housing, and each of the contact projections may be disposed between two coupling projections.

Advantageous Effects

According to the embodiment of the present invention, the power steering sensor assembly has such a structure that couples the sensing device to the housing without using a separate coupling member such as an O-ring. Therefore, the sensing device may be reliably and stably coupled to the housing, without being moved in the radial direction and the axial direction.

DESCRIPTION OF DRAWINGS

The above objects, and other features and advantages of the present invention will become more apparent after a reading of the following detailed description taken in conjunction with the drawings, in which.

BEST MODE

Figure 1:
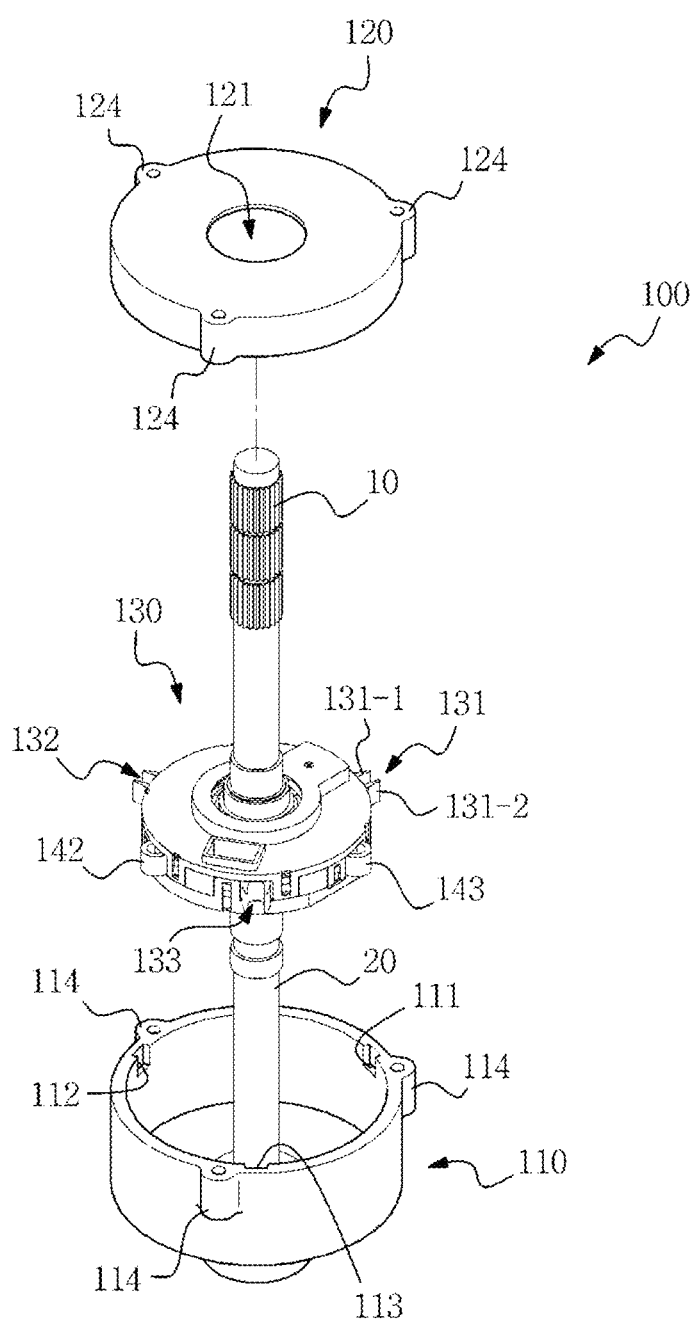
FIGS. 1 and 2 are perspective views of a power steering sensor assembly according to an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

In the following descriptions, "sensing device" indicates any one of a steering angle sensing device, a torque sensing device, and a combination of the steering angle sensing device and the torque sensing device which are components of an electric power steering system.

Figure 2:
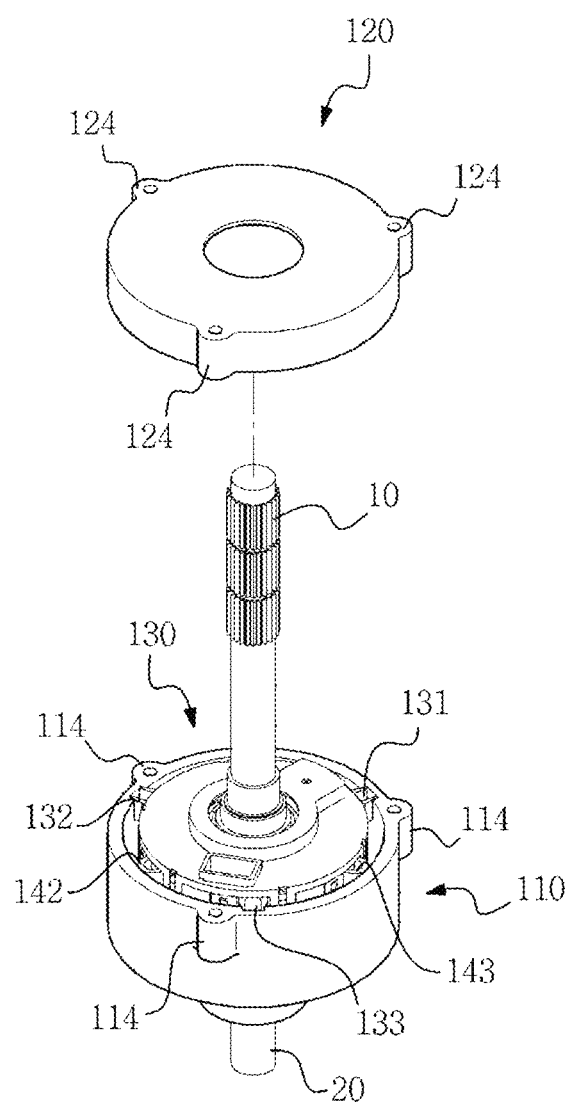
Figure 3:
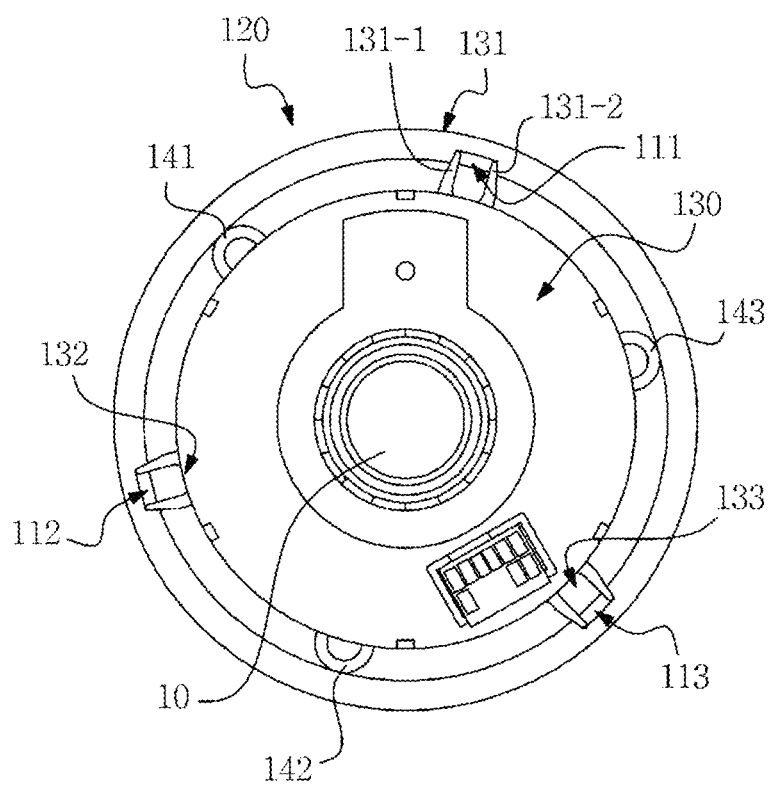
FIG. 3 is a plan view of the power steering sensor assembly in a state in which a second housing is removed from the structure illustrated in FIGS. 1 and 2.
Figure 4:
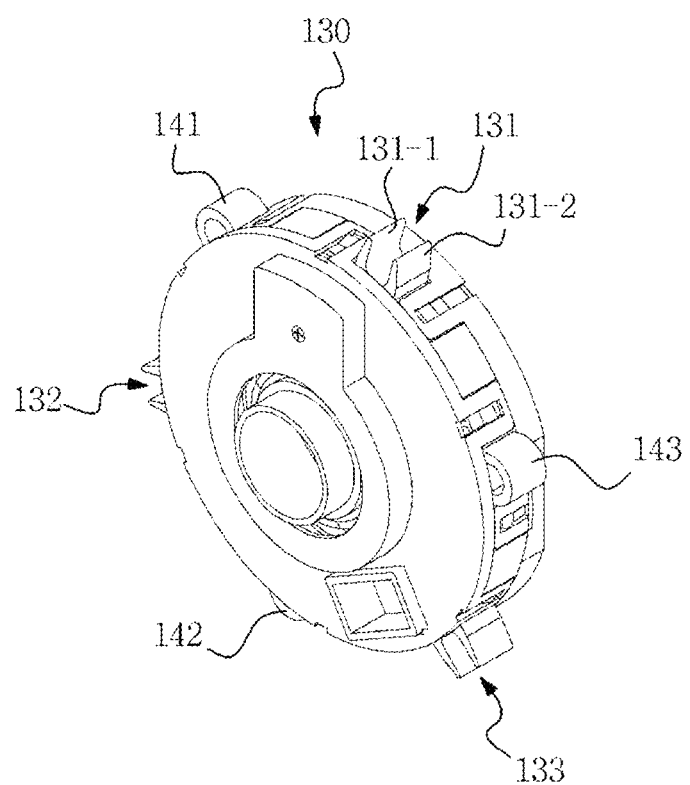
FIG. 4 is a perspective view of a sensing device illustrated in FIGS. 1 to 3.

FIGS. 1 and 2 are perspective views of a power steering sensor assembly according to an embodiment of the present invention. FIG. 3 is a plan view of the power steering sensor assembly in a state in which a second housing is removed from the structure illustrated in FIGS. 1 and 2. FIG. 4 is a perspective view of a sensing device illustrated in FIGS. 1 to 3.

The power steering sensor assembly 100 according to the embodiment of the present invention includes a first housing 110, a sensing device 130, and a second housing 120. The first housing 110 has a predetermined space formed therein. The sensing device 130 is fixed and positioned in the first housing 110. The second housing 120 is coupled to the first housing 110.

Meanwhile, an input shaft 10 connected to a steering wheel (not illustrated) and an output shaft 20 connected to the input shaft 10 through a torsion bar (not illustrated) and connected to wheels (not illustrated) are positioned in a through-hole formed in the center of the sensing device 130. Therefore, the sensing device 100 senses a steering angle and/or torque transferred by the input shaft.

Here, the input shaft 10 is extended to the outside through an opening 121 formed in the center of the second housing 120 and connected to an external member. The output shaft 20 is extended to the outside through an opening (not illustrated) thrilled in the center of the first housing 110 and connected to another external member.

On the upper portion of the inner circumferential surface of the first housing 110 in which the sensing device 130 is housed, a plurality of coupling grooves 111, 112, and 113 are formed. The coupling grooves 111, 112, and 113 are arranged at a predetermined distance from each other, and respectively have an upper end which is opened. Each of the coupling grooves 111, 112, and 113 has a predetermined width and depth.

On the outer circumferential surface of the sensing device 130, a plurality of coupling projections 131, 132, and 133 are formed. The coupling projections 131, 132, and 133 are extended and projected in a direction perpendicular to the outer circumferential surface, that is, the radius direction of the outer circumferential surface in the circular sensing device (illustrated in FIGS. 2 and 3). The coupling projections 131, 132, and 133 correspond to the coupling grooves 111, 112, and 113 of the first housing 110, respectively.

In such a structure, when the second device 130 is positioned in the first housing 110, the coupling projections 131, 132, and 133 are inserted into the coupling grooves 111, 112, and 113 of the first housing 110, respectively, to support the sensing device 130. Accordingly, the sensing device 130 is housed in the first housing 110, without being moved.

Meanwhile, each of the coupling projections, for example, the coupling projection 131 includes two bar-shaped members 131-1 and 131-2 separated horn each other in a direction parallel to the outer circumferential surface of the sensing device 110, in a state in which the coupling projection is fixed to the outer circumferential surface. That is, the bar-shaped members 131-1 and 131-2 are separated from each other in the circumferential direction in the circular sensing device illustrated in FIGS. 2 and 3. The bar-shaped members 131-1 and 131-2 may be formed of an elastic member.

When the coupling groove 131 is inserted into the coupling groove 111 of the first housing 110 in a state in which the bar-shaped members 131-1 and 131-2 are pressurized to each other, the outer surfaces of the respective bar-shaped members 131-1 and 131-2 are closely attached to sidewall surfaces of the coupling groove 111 by elastic forces of the bar-shaped members 131-1 and 131-2. Accordingly, the sensing device 130 may be reliably fixed inside the first housing 10, without being rotated.

Meanwhile, the length of each of the coupling projections of the sensing device 130, for example, the coupling projection 131, that is, the length of the bar-shaped members 131-1 and 132-1 is equal to the depth of the coupling groove 111 of the first housing 110, that is, the radial length of the coupling groove 111. In such a condition, when the coupling projection 131 is inserted into the coupling groove 111 of the first housing 110, the front ends of the bar-shaped members 131-1 and 131-2 are closely attached to the rear-end wall surface of the coupling groove 111. The rear end indicates an end side of the radial direction. Therefore, the sensing device 130 is not moved in the radial direction inside the first housing 10.

Furthermore, the height of the coupling projection 131 of the sensing device 130, that is, the height of the bar-shaped members 131-1 and 131-2 is equal to that of the coupling groove 111 of the first housing 110, that is, the axial length of the coupling groove 111. In such a condition, when the coupling projection 131 is inserted into the coupling groove 111 of the first housing 110 according to such a condition, lower-end surfaces of the respective bar-shaped members 131-1 and 131-2 are closely attached to the bottom surface of the coupling groove 111. Accordingly, the sensing device 130 is not moved in the axial direction inside the first housing 10.

Meanwhile, contact projections 141, 142, and 143 are formed on the outer circumferential surface of the sensing device 130. The contact projections 141, 142, and 143 are contacted with the inner circumferential surface of the first housing 110 to thereby inhibit the sensing device 130 from being moved or distorted in the radial direction inside the first housing 110.

The contact projections 141, 142, and 143 may be formed in such a shape as to project in the radial direction. The contact projections 141, 142, and 143 and the coupling projections 131, 132, and 133 are alternately arranged on the outer circumferential surface of the sensing device 130. The contact projections 141, 142, and 143 may be selectively formed, and the sensing device 130 may be more reliably housed in the first housing 110 by the contact projections 141, 142, and 143.

After the sensing device 130 is positioned in the first housing 110 according to the above-described structure, the second housing 120 is coupled to the first housing 110. On the outer circumferential surfaces of the first and second housings 110 and 120, coupling portions 114 and 124 are respectively formed, through which coupling means, for example, coupling screws (not illustrated) pass. As the coupling screws are coupled to the coupling portions 114 and 124 in a state in which both housings 110 and 120 are set to face each other, the housings 110 and 120 having the sensing device 130 fixed and housed therein are coupled to each other.

At this time, the upper end surfaces of the bar-shaped members 131-1 and 131-2 composing each of the coupling projections of the sensing device 130, for example, the coupling projection 131 are contacted with the lower-end circumferential surface of the peripheral portion of the second housing 120. Therefore, the upward movement of the sensing device 130 is also limited.

Here, FIGS. 1 to 4 illustrate the sensing device 130 has a circular plate shape and the first and second housings 110 and 120 have a cylindrical shape. However, the embodiment of the present invention is not limited thereto.

That is, the sensing device 130 may be formed in a polygonal shape including a triangle, and the first and second housings 110 and 120 may have a polygonal cylindrical shape of which the cross-section is formed in the same polygonal shape as that of the sensing device 130.

Meanwhile, as defined above, the sensing device 130 composing the embodiment of the present invention may include a steering angle sensing device, a torque sensing device, or a combination of the steering angle sensing device and the torque sensing device.

Hereinafter, an example in which the combination of the steering angle sensing device and the torque sensing device is used as the sensing device 130 will be described.

Figure 5:
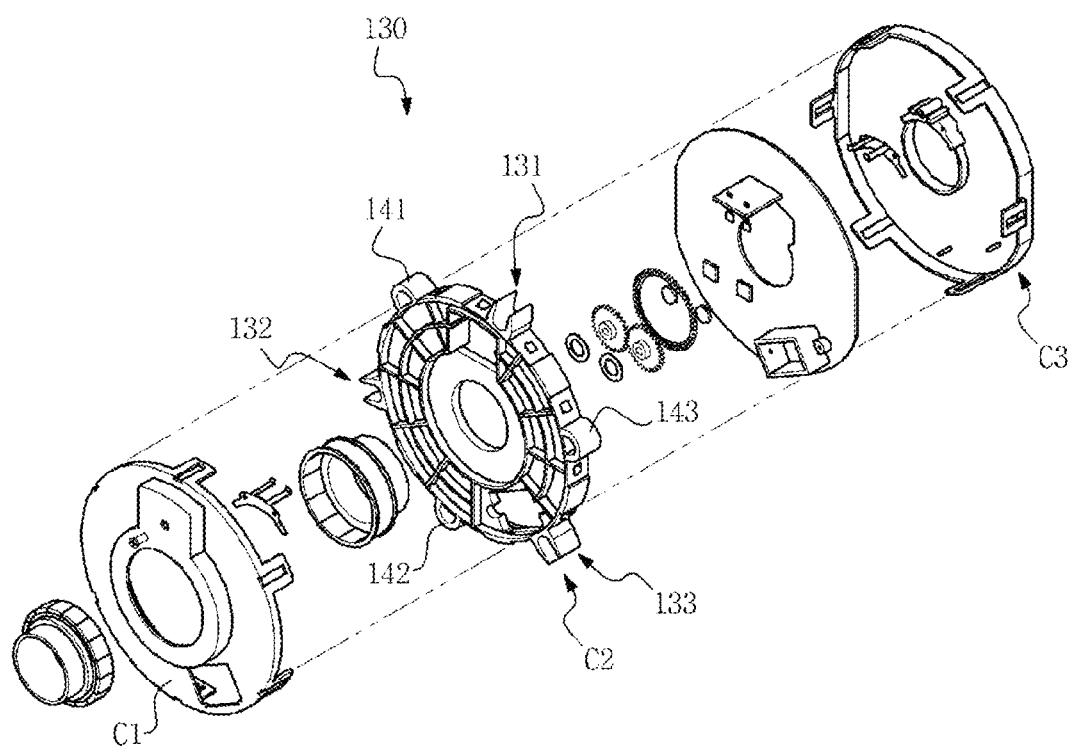
FIG. 5 is an exploded perspective view of the sensing device illustrated in FIG. 4.

FIG. 5 is an exploded perspective view of the sensing device of FIG. 4, illustrating the combination of the steering angle sensing device and the torque sensing device.

The sensing device 130 serving as the combination of the steering angle sensing device and the torque sensing device includes a first cover C1, a second cover C2, and a third cover C3.

Components of the torque sensing device are arranged between the first and second covers C1 and C2, and components of the steering angle sensing device are arranged between the second and third covers C2 and C3.

The first to third covers C1 to C3 are coupled to each other to construct the sensing device 130 illustrated in FIGS. 1 to 4. The sensing device 130 is housed in the first housing 110 to construct the power steering sensor assembly.

Here, elements and functions of the torque sensing device and the steering angle sensing device are known to those skilled in the art, and the descriptions thereof will be omitted.

Meanwhile, referring to FIG. 5, the coupling projections 131, 132, and 133 and the contact projections 141, 142, and 143, which have been described above, are formed on the outer circumferential surface of the second cover C2. However, the embodiment of the present invention is not limited thereto.

Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:

1. A sensing device for a power steering sensor assembly, the sensing device comprising:
    a first cover;
    a second cover comprising a plurality of coupling projections disposed on an outer circumferential surface thereof; and
    a torque sensing device disposed between the first cover and the second cover,
    wherein the first cover and the second cover are configured to inhibit movement of the torque sensing device in an axial direction, and
    wherein the coupling projections protrude in a radial direction of the second cover with respect to an outer circumferential surface of the first cover.

2. The sensing device according to claim 1, wherein each of the coupling projections comprises two bar-shaped members extended in a direction perpendicular to the outer circumferential surface of the second cover and separated from each other in a direction parallel to the outer circumferential surface of the second cover.

3. The sensing device according to claim 2, wherein each of the bar-shaped members is formed of an elastic material.

4. The sensing device according to claim 1, wherein the second cover further comprises a plurality of contact projections each having a curved surface, extended in the radial direction of the second cover, and formed on the outer circumferential surface of the second cover, and wherein each contact projection is configured to contact an inner circumferential surface of a housing.

5. The sensing device according to claim 4, wherein the coupling projections and the contact projections are disposed on the outer circumferential surface of the second cover in an alternating fashion, such that each coupling projection is disposed between two contact projections and each contact projection is disposed between two coupling projections.

6. The sensing device according to claim 4, comprising three coupling projections and three contact projections.

7. The sensing device according to claim 6, wherein each of the coupling projections comprises two bar-shaped members extended in a direction perpendicular to the outer circumferential surface of the second cover and separated from each other in a direction parallel to the outer circumferential surface of the second cover.

8. The sensing device according to claim 7, wherein the coupling projections and the contact projections are disposed on the outer circumferential surface of the second cover in an alternating fashion, such that each coupling projection is disposed between two contact projections and each contact projection is disposed between two coupling projections.

9. The sensing device according to claim 6, further comprising a third cover coupled to the second cover.

10. The sensing device according to claim 9, further comprising a steering angle sensing device disposed between the second cover and the third cover.

11. The sensing device according to claim 1, wherein the torque sensing device is configured to connect to an input shaft and an output shaft.

12. The sensing device according to claim 1,
    wherein the plurality of coupling projections are configured to be coupled to a housing.

13. The sensing device according to claim 1, further comprising a third cover coupled to the second cover.

14. The sensing device according to claim 13, further comprising a steering angle sensing device disposed between the second cover and the third cover.

15. The sensing device according to claim 1, further comprising three coupling projections.

16. The sensing device according to claim 15, wherein each of the coupling projections comprises two bar-shaped members extended in a direction perpendicular to the outer circumferential surface of the second cover and separated from each other in a direction parallel to the outer circumferential surface of the second cover.

17. A sensing device for a power steering sensor assembly, the sensing device comprising:
- a first cover;
- a second cover; and
- a torque sensing device disposed between the first cover and the second cover,
- wherein the second cover comprises a plurality of contact projections formed on an outer circumferential surface thereof,
- wherein the first cover and the second cover are configured to inhibit movement of the torque sensing device in an axial direction, and
- wherein the contact projections protrude in a radial direction of the second cover with respect to an outer circumferential surface of the first cover.

18. The sensing device according to claim 17, wherein the torque sensing device is configured to connect to an input shaft and an output shaft.

19. The sensing device according to claim 17, wherein each of the plurality of contact projections has a curved surface.

20. An electric power steering system comprising:
- input and output shafts;
- a sensing device comprising a first cover, a second cover, and a torque sensing device disposed between the first cover and the second cover; and
- a housing having the sensing device housed therein,
- wherein the second cover comprises a plurality of coupling projections disposed on an outer circumferential surface thereof and coupled to coupling grooves of the housing,
- wherein the torque sensing device is connected to the input and output shafts,
- wherein the first cover and the second cover are configured to inhibit movement of the torque sensing device in an axial direction, and
- wherein the coupling projections protrude in a radial direction of the second cover with respect to an outer circumferential surface of the first cover.

* * * * *